US009923878B2

(12) United States Patent
Sutherland et al.

(10) Patent No.: US 9,923,878 B2
(45) Date of Patent: *Mar. 20, 2018

(54) PRIMITIVE FUNCTIONS FOR USE IN REMOTE COMPUTER MANAGEMENT

(71) Applicant: KASEYA LIMITED, Dublin (IE)

(72) Inventors: Mark J. Sutherland, Milpitas, CA (US); Paul Y. Wong, Fremont, CA (US)

(73) Assignee: KASEYA LIMITED, Dublin (IE)

( * ) Notice: Subject to any disclaimer, the term of this patent is extended or adjusted under 35 U.S.C. 154(b) by 235 days.

This patent is subject to a terminal disclaimer.

(21) Appl. No.: 14/948,337

(22) Filed: Nov. 22, 2015

(65) Prior Publication Data
US 2016/0149874 A1 May 26, 2016

Related U.S. Application Data

(63) Continuation of application No. 14/474,494, filed on Sep. 2, 2014, now Pat. No. 9,197,491, which is a continuation of application No. 13/493,450, filed on Jun. 11, 2012, now Pat. No. 8,825,826, which is a continuation of application No. 10/883,643, filed on Jun. 30, 2004, now Pat. No. 8,200,794.

(51) Int. Cl.
 *H04L 9/32* (2006.01)
 *H04L 29/06* (2006.01)
 *H04L 12/24* (2006.01)

(52) U.S. Cl.
 CPC .......... *H04L 63/0442* (2013.01); *H04L 41/00* (2013.01); *H04L 41/046* (2013.01); *H04L 63/0209* (2013.01); *H04L 63/0281* (2013.01); *H04L 63/0428* (2013.01); *H04L 63/061* (2013.01); *H04L 63/0838* (2013.01); *H04L 63/0435* (2013.01); *H04L 63/067* (2013.01)

(58) Field of Classification Search
 CPC ... H04L 63/0442; H04L 41/00; H04L 41/046; H04L 63/0209; H04L 63/0281; H04L 63/0428; H04L 63/061; H04L 63/0838; H04L 63/0435; H04L 63/067
 See application file for complete search history.

*Primary Examiner* — Ryan Jakovac

(57) ABSTRACT

The invention facilitates remote management of a computer via a network. Remote computer management capability can be expanded beyond that previously available through the addition of one or more new primitive functions that can be performed on a managed computer.

20 Claims, 5 Drawing Sheets

PRIMITIVE FUNCTIONS FOR USE IN REMOTE COMPUTER MANAGEMENT

CROSS-REFERENCE TO RELATED APPLICATION

The instant application is a continuation of and claims priority from patent application Ser. No. 14/474,494, filed Sep. 2, 2014, entitled PRIMITIVE FUNCTIONS FOR USE IN REMOTE COMPUTER MANAGEMENT, issued U.S. Pat. No. 9,197,491, issued Nov. 24, 2015, which is a continuation of patent application Ser. No. 13/493,450, filed Jun. 11, 2012, entitled PRIMITIVE FUNCTIONS FOR USE IN REMOTE COMPUTER MANAGEMENT, issued U.S. Pat. No. 8,825,826, issued Sep. 2, 2014, which is a continuation of patent application Ser. No. 10/883,643, filed Jun. 30, 2004, entitled PRIMITIVE FUNCTIONS FOR USE IN REMOTE COMPUTER MANAGEMENT, issued U.S. Pat. No. 8,200,794, issued Jun. 12, 2012, the entire contents of each are incorporated by reference herein.

BACKGROUND OF THE INVENTION

1. Field of the Invention

This invention relates to remote management of a computer via a network.

2. Related Art

The use of a computer typically entails some management of the operation of, and activities engaged in by, the computer. For organizations that make use of many computers, management of those computers can be an especially burdensome task; such organizations often have one or more people who are specifically responsible for the management of the organization=s computers. Management of a computer can entail any of a large variety of activities, as well known to those skilled in that art. Computer management can include, for example, one or more of the following: taking inventory of the hardware comprising a computer and/or the software installed on a computer; installation, configuration and/or updating of software on a computer; establishing and updating security parameters (e.g., passwords, access permissions) on a computer; deploying and installing system patches on a computer; monitoring usage of computer resources and/or computer operation; identifying and tracking problems with computer operation; producing an alert when a problem with computer operation occurs; controlling one or more aspects of the operation of a computer; and providing assistance to a user in effecting desired operation of a computer.

A computer to be managed may not be at the same location as the person who must do the management. This may be often be true, for example, for organizations with computers operating at different locations: there may not be a person at each such location with the skills and/or knowledge required to manage the computer(s) at that location. Thus, in the past, when it has been necessary or desirable to engage in management of computer(s) at a particular location, it has sometimes been necessary for a person with the requisite skills and/or knowledge to travel to that location. As can readily be appreciated, this may be undesirable for a variety of reasons, e.g., it may be inconvenient and/or too costly to travel to the location, it may be discovered after arriving at the location that tools and/or information necessary to manage a computer are not present at that location, etc. With the advent and increasing presence of computer networks, tools have been developed to enable remote management of a computer via a computer network, i.e., management of a computer located at one site of a computer network using a computer located at another site of the computer network.

Computers that can be connected to a network may have software installed thereon that controls access to the network by the computer and from the network to the computer. For example, a firewall can be useful in inhibiting unwanted access to or from the computer via the network. A gateway can also be useful in inhibiting unwanted access to or from the computer via the network and can additionally perform network address translation (NAT) that is used to direct network communication to an appropriate computer when multiple computers share a single network address. However, the presence of a firewall and/or gateway can also prevent remote management of a computer by stopping incoming instructions and/or data used to effect the remote management. As a result of greater concern regarding the security of computers that can be connected to a network (in particular, public networks such as the Internet), the use of firewalls and/or gateways has become common and is increasing, thus significantly inhibiting the usefulness of existing systems for remote computer management.

A proxy server can be present at a computer network site to mediate and control access to the network by computer(s) at that site. (Typically, a proxy server is used at a computer network site at which multiple computers—often, a very large number, such as 50 or 100 or more—access the network via the site, such as is the case with a large organization that has many computers accessing a computer network via a much smaller number of network sites, though this need not necessarily be the case.) All network communication from computer(s) at a network site at which a proxy server is present must be directed to the proxy server, which then decides whether the communication can pass through to the network. A proxy server can be used, for example, when it is desired to impose more—or simply different—control over access to a computer network than is provided by a firewall and/or gateway. When a proxy server is present at a computer network site, a (prospective) remotely managed computer at that site cannot directly communicate with a computer at another site of the network (i.e., attempt to communicate via the communication port assigned for communication with the computer at the other site) that is seeking to effect particular management action(s) with respect to the remotely managed computer, since all communication from the remotely managed computer must be routed to the communication port assigned for communication with the proxy server. Thus, the presence of a proxy server at a computer network site can prevent or inhibit management of computer(s) at that site by a system for remote computer management.

A computer at a computer network site may also be connected to one or more other devices present at that site, such as a switch, router, peripheral device (such as, for example, a printer, scanner, keyboard or display monitor) or another computer. It may be desirable to manage a device connected to a remote computer in addition to, or instead of, managing the computer. However, unless such device is accessible directly via the network (which is often not the case), existing systems for remote computer management do not enable this capability.

It can be desirable to update software used to implement (in whole or in part) a system for remote computer management after the software is installed and operating, e.g., to add new functionality to the remote computer management system. This can be done, for example, by uninstalling an existing version of the software and installing a new version of the software, or by installing an update to the existing version of the software. However, these approaches will disrupt operation of the remote computer management system, other operation of computer(s) on which the remote computer management system is implemented, and/or activities of users of the computer(s) on which the remote computer management system is implemented. These approaches may also experience error during the installation process, producing even more disruption or, in the worst case, precluding update of the software. Further, since these approaches are necessarily disruptive to some degree, they are typically only used to provide updates that make substantial changes (e.g., add substantial new functionality) to an existing version of the software, thus reducing the flexibility (e.g., the granularity) with which the software can be updated. Finally, these approaches can cause the instructions and/or data comprising the software to require an undesirably large amount of storage capacity. Another approach to updating software used to implement a remote computer management system is to provide one or more new stand-alone executable files that can be accessed by the remote computer management software to make use of the functionality produced by those executable file(s). However, when the new executable file(s) first attempt to operate, security software (which is frequently operating on computer(s) used to implement the remote file management system) may identify this as an attempt to begin operation of a new process that has not previously been authorized, and either stop the operation or present a user interface (e.g., dialog box) that requires instruction (often from a user who may not have the requisite knowledge to respond appropriately) as to whether the operation should be allowed to continue, in either case disrupting operation of the remote computer management system.

SUMMARY OF THE INVENTION

The invention facilitates remote management of a computer via a network. A computer at one site of a computer network is used by a remote administrator to request performance of management action(s) regarding a specified computer (the Amanaged computer@) and/or other device located at another site of the network. The request is transmitted to a remote computer management server that is typically located at still another site of the computer network that is different from the other two network sites. The remote computer management server communicates with the managed computer to effect the requested management action(s) and, as appropriate, reports the result(s) to the computer being used by the remote administrator. The invention encompasses several aspects of implementing such a remote computer management system that facilitate the remote management of a computer.

In one embodiment of the invention, remote management of a managed computer is facilitated by i) initiating, from the managed computer, communication between the managed computer and a remote computer management server via a network, the communication including querying (if the communication between the managed computer and the remote computer management server is successfully initiated) the remote computer management server regarding whether a management action is to be performed on the managed computer, wherein the communication is formatted in accordance with a network communications protocol that can be used to format communication that is allowed to pass through a firewall and/or gateway that mediates communication with the managed computer; ii) receiving a response from the remote computer management server indicating whether a management action is to be performed on the managed computer and, if so, what operation or operations are to be performed by the managed computer to effect performance of the management action; iii) effecting performance by the managed computer of the operation or operations that effect performance of a management action; and iv) communicating to the remote computer management server a result or results of the performance by the managed computer of an operation or operations that effect performance of a management action.

In another embodiment of the invention, remote management of a managed computer at a first site of a computer network is facilitated by i) detecting the presence of a proxy server at the first site of the computer network; and ii) initiating, from the managed computer, communication via the computer network between the managed computer and a remote computer management server at a second site of the computer network, the communication including querying (if the communication between the managed computer and the remote computer management server is initiated) the remote computer management server regarding whether a management action is to be performed on the managed computer, wherein communication from the managed computer to the remote computer management server is routed to a communication port assigned for communication with the proxy server, with instructions to then send the communication to the remote computer management server.

In yet another embodiment of the invention, remote computer management is performed by i) receiving at a managed computer a request from a remote computer management server to perform a management action regarding a device connected to the managed computer; ii) communicating between the managed computer and the device connected to the managed computer to effect performance of an operation or operations that effect performance of the management action regarding the device connected to the managed computer; and iii) communicating from the managed computer to the remote computer management server a result of the performance of the management action regarding the device connected to the managed computer.

In still another embodiment of the invention, remote management of a managed computer is facilitated by i) instructions and/or data for effecting performance by the managed computer of an operation or operations that effect performance of a management action, wherein the instructions and/or data for effecting performance of an operation or operations can make use of a set of instructions and/or data included in a dynamically loaded library (or other set of instructions and/or data that will not be identified as a new executing process on the managed computer) to effect performance of an operation or operations; ii) receiving at the managed computer from a remote computer management server via a network a dynamically loaded library that includes one or more sets of instructions and/or data that can be used to effect performance of an operation or operations to produce an operation or operations not previously enabled; and iii) receiving at the managed computer a request via the network from the remote computer management server to effect performance of an operation or operations that effect performance of a management action, wherein the management action requires an operation that is produced by using a set of instructions and/or data from the received dynamically loaded library.

In another embodiment of the invention, remote management of a managed computer is facilitated by i) effecting performance by the managed computer of an operation or operations that effect performance of a management action, wherein effecting performance of an operation or operations can effect performance of one or more primitive functions from a set of primitive functions including one or more of the following primitive functions: Get value for script variable, Added printers to audit, Get File in multiple blocks, Enumerate registry subkeys, Enumerate registry values, Enumerate directory listing, Incremental audit, Execute application and return output; and Extend audit to include file types in addition to .exe; and iii) communicating from the managed computer to a remote computer management server via a network a result of the performance of the management action.

DETAILED DESCRIPTION OF THE INVENTION

Figure 1:
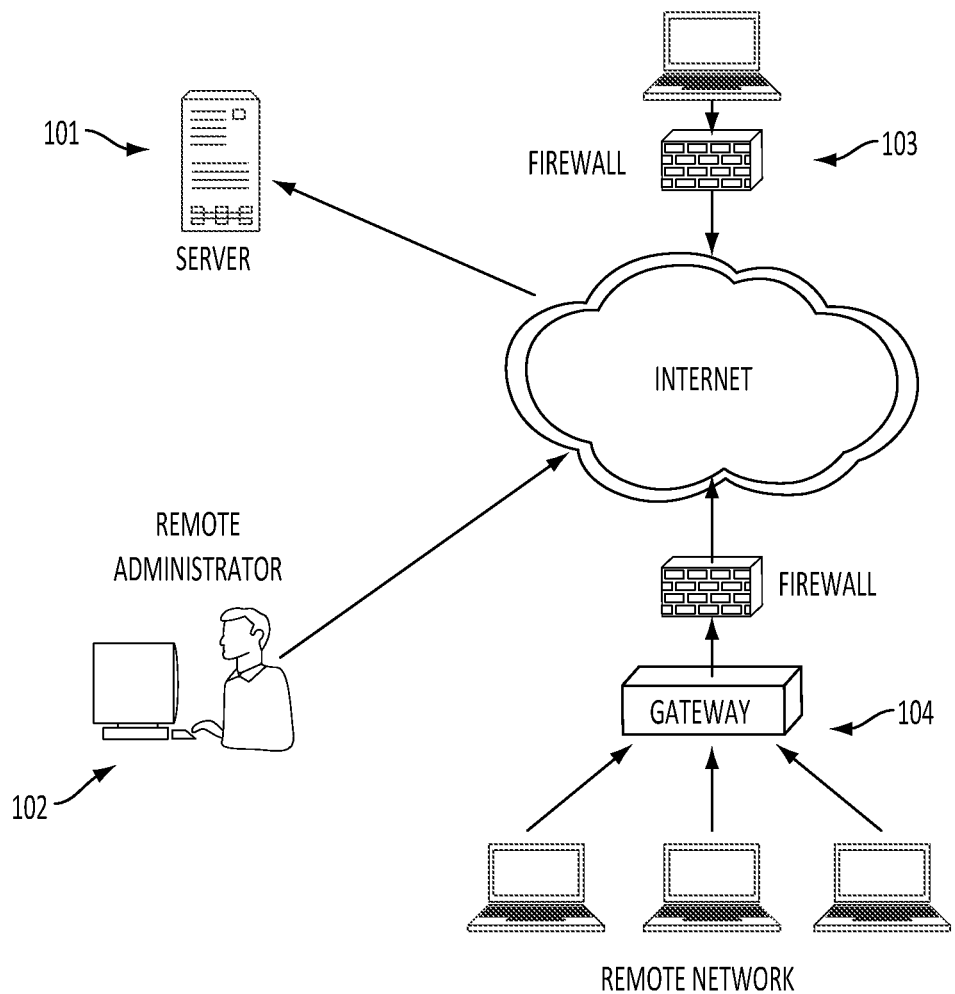
FIG. 1 is a diagram of an embodiment of a network in which remote computer management according to the invention can be used, illustrating various capabilities of the invention.

The invention facilitates remote management of a computer via a network. A computer at one site of a computer network is used by a remote administrator to request performance of management action(s) regarding a specified computer (the Amanaged computer@) and/or other device located at another site of the network. The request is transmitted to a remote computer management server that is typically located at still another site of the computer network that is different from the other two network sites. The remote computer management server communicates with the managed computer to effect the requested management action(s) and, as appropriate, reports the result(s) to the computer being used by the remote administrator. As described in detail below, the invention encompasses several aspects of implementing such a remote computer management system that facilitate the remote management of a computer.

According to one aspect of the invention, remote computer management in which communication between a managed computer (i.e., a computer that is to be remotely managed) and a remote computer management server (i.e., a computer that communicates with the managed computer to effect requested management action(s)) is initiated by the managed computer is implemented so that the communication is formatted in accordance with a network communications protocol that can be used to format communication that is allowed to pass through a firewall and/or gateway that mediates communication with the managed computer. According to another aspect of the invention, remote computer management in which communication between a managed computer and a remote computer management server is initiated by the managed computer is implemented so that the presence of a proxy server at the site at which the managed computer is located can be detected, and communication from the managed computer to the remote computer management server is routed to a communication port assigned for communication with the proxy server, with instructions to then send the communication to the remote computer management server. According to yet another aspect of the invention, remote management of a device connected to a managed computer can be effected by using the managed computer as a proxy for conducting a management action regarding the connected device on behalf of a remote computer management server. According to still another aspect of the invention, remote computer management capability can be updated by providing to a managed computer, for use by software operating on the managed computer to effect management actions, a dynamically loaded library (or other set of instructions and/or data that will not be identified as a new executing process on the managed computer) that includes functionality not previously enabled by the software operating on the managed computer. According to another aspect of the invention, remote computer management capability can be expanded beyond that previously available through the addition of one or more new primitive functions that can be performed on a managed computer. An embodiment of the invention can be implemented to include one or any combination (including all) of the aspects of the invention described above. Further, an embodiment of the invention can be implemented as a method in accordance with the description of the invention herein, a system or apparatus for performing such a method, or a computer program including instructions and/or data for performing such a method.

Herein, "computer" can refer to any device having computational capability sufficient to accomplish relevant functions of the invention and the capacity for communication with other such devices via a network of which the devices are part. As used herein, a "computer" can be embodied by, for example, a desktop computer, server computer, portable computer (e.g., notebook computer, personal digital assistant), cellular phone, a router or a network-ready Asmart@ appliance. The invention can be implemented with computers operating in accordance with any operating system, e.g., a Windows operating system, a Unix operating system, a MacIntosh operating system.

Management of a computer can include any of a variety of tasks (often referred to herein as Amanagement actions@). For example, as discussed above, management of a computer can include one or more of the following: taking inventory of the hardware comprising a computer and/or the software installed on a computer; installation, configuration and/or updating of software on a computer; establishing and updating security parameters (e.g., passwords, access permissions) on a computer; deploying and installing system patches on a computer; monitoring usage of computer resources and/or computer operation; identifying and tracking problems with computer operation; producing an alert when a problem with computer operation occurs; controlling one or more aspects of the operation of a computer; and providing assistance to a user in effecting desired operation of a computer. Each of these management actions can be accomplished by performing one or more operations on the managed computer, such as, for example, manipulating the file system on the managed computer, starting/stopping/monitoring any process (e.g., system services, application programs) operating on the managed computer, reading/writing/editing the registry of the managed computer, and/or remotely controlling devices such as a screen and/or keyboard of the managed computer.

The invention can be implemented to enable remote computer management via any of a variety of computer networks. In particular, the invention can be implemented to enable remote computer management via any computer network that makes use of a TCP/IP protocol (including protocols based on TCP/IP protocol, such HTTP, HTTPS and FTP) to effect communication via the network. For example, the invention can advantageously be implemented to enable remote computer management via the Internet. The invention can also be implemented to enable remote computer management via any other public computer network, as well as via a private computer network, such as an intranet for a corporation or other organization.

The invention facilitates remote computer management. In particular, a computer (for convenience, sometimes referred to herein as a Aremote administrator computer@) that is used by a remote administrator to request performance of management action(s) regarding a managed computer is remote from the managed computer. Herein, two computers are Aremote@ from each other if the two computers are located at different sites of a computer network of which the two computers are part. A Acomputer network site@ is a group of one or more computers that share a single network address. (There may also be other devices present at a computer network site.) Two computer sites can be located at the same or different geographic locations. It is anticipated that the invention will typically be implemented for use in situations in which the remote administrator computer and the managed computer are at network sites that not readily accessible to each other, such as locations separated by a large distance (e.g., several or many miles). The remote computer management server may or may not be remote from the remote administrator computer or the managed computer (though it must be remote from at least one).

FIG. 1 is a diagram of an embodiment of a network in which remote computer management according to the invention can be used, illustrating various capabilities of the invention. In FIG. 1, computers at various sites are connected to the Internet. A remote computer management server operates at site 101. A remote administrator uses a computer at site 102 to effect management of one or more remote computers by communicating request(s) for management action(s) to the remote computer management server. (In general, the invention can be used to enable management of any number of computers.) A computer at site 103 is connected to the Internet through a firewall which controls access to the Internet by the computer. Multiple computers at site 104 are connected to the Internet through a gateway and a firewall. In response to request(s) from the remote administrator, the remote computer management server can communicate one or more commands to the computers at sites 103 and/or 104 to cause those computers to perform one or more operations that effect management action(s) requested by the remote administrator. In particular, as explained in more detail below, the invention can enable the remote administrator to manage the computers at site 103 and 104, notwithstanding the presence of a firewall at both sites and a gateway at site 104.

Each managed computer has installed thereon one or more computer programs (for convenience, referred to herein as Aagent software@) including instructions and/or data that can be used in effecting requested management of the managed computer. In particular, the agent software can receive commands from a remote computer management server, perform operations on the managed computer (or, in some embodiments of the invention, on device(s) connected to the managed computer) in accordance with the received commands, and, as appropriate, report the results of the operations to the remote computer management server. The agent software can advantageously be implemented so that operation of the agent software doesn't affect other operation of the managed computer to a significant degree. The agent software can be implemented to perform only basic operations (e.g., the primitive functions discussed below) that require little processing or data storage capacity of the managed computer. For example, the agent software can be implemented by computer program(s) that require only several hundred kilobytes of data storage. Additionally, the agent software can advantageously be installed on a managed computer as a system service, thus affording the agent software the same rights and privileges as the operating system of the managed computer. This status can be useful in facilitating execution of the primitive functions discussed below because it enables the primitive functions to be executed by the managed computer without need for user logon or other user intervention. This status can also be useful in facilitating update of the agent software in accordance with an aspect of the invention described below (i.e., by using a dynamically loaded library). The invention can be implemented so that an administrator credential is securely bound to software (which can be encrypted) used to install the agent software, in order to ensure that the agent software has adequate usage rights on a managed computer (which may not otherwise be the case, e.g., if the person doing the installation does not have administrator rights on the managed computer) to enable installation of the agent software as a Asystem service @ on the managed computer.

The remote computer management server has installed thereon one or more computer programs (for convenience, sometimes referred to herein as Aserver software@) including instructions and/or data that can be used to effect management of a computer (or, in some embodiments of the invention, device(s) connected to the computer) in response to a request from a remote administrator. In particular, the server software can receive a request from a remote administrator to perform a management action on a managed computer (or connected device), receive a query from agent software regarding whether a management action is to be performed on the managed computer (or connected device) on which the agent software is operating, communicate a command to agent software to perform a specified operation on the managed computer (or connected device), and receive a response, as appropriate, from the agent software that indicates a result produced by performance of an operation on the managed computer (or connected device). The remote computer management server can also store data regarding the status and/or configuration of a managed computer (or connected device).

The invention can be implemented so that, in general, a remote administrator can use any computer that can be connected to the network to effect remote management of one or more other computers connected to the network. In that vein of generality, the invention can be implemented so that no software particular to the invention need be installed on a remote administrator computer to enable remote computer management in accordance with the invention. For example, when the invention is implemented to enable remote management of computers via the Internet, the invention can be implemented to enable the remote administrator to effect such management by using a conventional Web browser to contact the remote computer management server (e.g., access an appropriate Web site) and communicate requested management actions.

On a recurring basis, the agent software operating on a managed computer attempts to initiate communication with the remote computer management server to query whether the remote computer management server has any management actions for the agent software to perform. For example, the invention can be implemented so that the agent software attempts to initiate communication with the remote computer management server at regular intervals. It is desirable that the agent software query relatively frequently whether the remote computer management server has any management actions for the agent software to perform so that a remote administrator won=t possibly have to wait a long time for the result of a requested management action. The invention can be implemented, for example, so that the agent software attempts to initiate communication with the remote computer management server every n seconds (e.g., every 30 seconds or some other period of time less than about a minute). The invention can be implemented so that if the agent software is not successful on a first attempt in initiating communication with the remote computer management server, the agent software tries again one or more times to initiate such communication. For example, the invention can be implemented so that the agent software attempts to initiate communication with the remote computer management server at regular intervals for a specified period of time or for a specified number of attempts, e.g., attempt to initiate communication every n seconds until m attempts have been made. If the agent software is successful in initiating communication with the remote computer management server, the agent software waits for a response from the remote computer management server. If the remote computer management server has a management action or actions for the agent software to perform, then the remote computer management server will communicate one or more commands to the agent software that effect performance of the management action(s). If there are no management actions for the agent software to perform, or if the agent software was unsuccessful in initiating communication with the remote computer management server (even after making a specified number of attempts), then the agent software waits until the next specified time to attempt again to initiate communication with the remote computer management server. In this way, the agent software continually polls the remote computer management server to identify management actions to be undertaken by the agent software on the managed computer. The invention can be implemented so that the particular parameters regarding attempts to initiate communication with the remote computer management server (e.g., the times at which the agent software attempts to initiate communication with the remote computer management server; the interval between, and number of, attempts to initiate communication with the remote computer management server after an unsuccessful first attempt) can be established by a user of an embodiment of the invention (e.g., a reseller of software embodying the invention or an entity that uses the invention to remotely manage its computers).

It is desirable to make operation of the agent software on the managed computer as unobtrusive as possible. For example, as indicated above, the agent software can be implemented as one or more computer programs that require relatively little space to store and relatively little processing resources to execute. In this vein, the agent software can be implemented so that, before attempting to initiate communication with the remote computer management server, the agent software checks to determine whether a connection to the network has already been established. If so, then the agent attempts to initiate communication with the remote computer management server. If not, the agent software does not attempt to initiate such communication. Implementing the agent software in this way can be desirable because it can prevent disruption of a user of the managed computer who is working on the managed computer at a time when the managed computer is not connected to the network by the display of a dialog box (as is commonly produced on a computer when attempting to connect to a network) announcing that the managed computer is attempting to establish a network connection. Such disruption can be particularly bothersome since the agent software will typically be implemented to attempt to initiate communication with the remote computer management server on a frequent basis (e.g., every 30 seconds or a minute).

As indicated above, the invention enables a remote administrator to remotely manage a computer via a network, notwithstanding the presence of a firewall and/or a gateway that mediates connection by the managed computer to the network. A firewall or gateway is often configured to prevent communication that is not in response to an outgoing communication initiated by the computer being protected by the firewall or gateway. (For convenience, such communication is sometimes referred to herein as Ainbound communication.@) However, many firewalls and gateways allow any communication that is in response to an outgoing communication initiated by the computer being protected by the firewall or gateway. (For convenience, such communication is sometimes referred to herein as Aoutbound communication.@) Thus, a system for remote computer management in which communication with a managed computer is initiated by another computer on the network will often be prevented from managing a computer that is protected by a firewall and/or gateway (and, as discussed above, the number of such computers is significant and is increasing). A firewall and/or gateway can be configured to allow such inbound communication, but doing so reduces the efficacy of the firewall and/or gateway and is therefore generally undesirable. To address this problem, the invention can be implemented so that all communication between the remote computer management server and the agent software is initiated by the agent software, as described above, i.e., all communication required to remotely manage a computer is outbound communication from that computer. Implementing the invention in this way also enables such communication to traverse a gateway that performs NAT, since the gateway can store an identification of the managed computer that initiated communication while the a communication session is ongoing. The agent software can be implemented so that the agent software does not accept inbound communication, thus eliminating the need to configure a firewall or gateway to allow such communication. This is advantageous since, in many implementations of the invention, there will be a large number of managed computers that would otherwise require firewall and/or gateway configuration. Additionally, managed computers are often not operated by users having the requisite knowledge or inclination to appropriately configure a firewall and/or gateway; implementing the invention in this way avoids problems associated with the need for such users to configure a firewall and/or gateway. The remote computer management server does accept inbound communication. However, configuring the firewall and/or gateway of a remote computer management server to allow inbound communication imposes little burden, since there is only one (or, perhaps, a few) for which the firewall and/or gateway must be configured, and the remote computer management server is often a computer that is operated by, or readily accessible to, user(s) (e.g., information technology specialists) that are comfortable with appropriately configuring a firewall and/or gateway.

Some firewalls or gateways are more restrictive than described above: not only do they not allow inbound communication, they allow outbound communication only if the communication is formatted in accordance with a particular communication protocol that is identified as allowable by the firewall or gateway. In a further embodiment of the invention, the agent software communicates using a specified communication protocol that formats communication in a way that is expected to be identified as allowable by an adequate number of firewalls and gateways. In particular, the invention can be implemented so that the agent software communicates using a communication protocol that is used for other types of communication that firewalls and gateways typically allow. The HTTP and HTTPS protocols are examples of such communication protocols (since these protocols are often used for communication via the Internet, firewalls and/or gateways are often configured to allow outbound communication formatted in accordance with one of these protocols); the invention can be implemented so that the agent software communicates using either of those communication protocols. The invention can also be implemented so that the agent software communicates using FTP or and any other protocol based on TCP/IP protocol. Further, the invention can be implemented so that when the agent software attempts to initiate communication with the remote computer management server, a succession of attempts are made, in each of which the communication is formatted in accordance with a unique one of a set of different communication protocols, until one version of the communication is allowed by the firewall and/or gateway; subsequent communication is then formatted in accordance with the communication protocol used for that version of the communication. As the implementations of firewalls and gateways evolve in the future, the communication protocols that are typically allowed by those future firewalls and gateways may be different from those that are currently commonly allowed; the invention contemplates the use of such communication protocols in enabling communication from the agent software.

The invention can be implemented so that all communication between the agent software and the remote computer management server is routed through a single network communications port. In particular, the invention can be implemented so that all communication between the agent software and the remote computer management server is routed through a single network communications port that is known or likely to already be allowed by many or all firewalls and gateways for network communications. For example, particular network communication protocols typically make use of a particular port for communications in accordance with that protocol, e.g., SSL communications typically are routed through port 443, HTTP communications typically are routed through port 80. When the invention is implemented to format communications between the agent software and remote computer management server in accordance with a particular communications protocol, as discussed above, routing communication through a single port happens naturally as a consequence of that formatting. In the same vein, when the invention is implemented so that the agent software successively tries initiating communication with the remote computer management server in accordance with different communication protocols until one works, communication between the agent software and remote computer management server is routed through the port that is already otherwise used for communications in accordance with that protocol. Implementing the invention so that all communication between the agent software and the remote computer management server is routed through a single network communications port reduces or eliminates the likelihood that communications between the agent software and the remote computer management server will be blocked by a firewall or gateway. Further, implementing the invention so that all communication between the agent software and the remote computer management server is routed through a single network communications port that is known or likely to already be allowed by many or all firewalls and gateways for network communications reduces or eliminates the need to specially configure a firewall and/or gateway (with attendant reduction in effectiveness) to allow such communication through one or more ports that would otherwise be used for communication of that type.

The server software operating on the remote computer management server is implemented so that the server software can break down each management action that can be requested by a remote administrator into one or more simpler component operations (e.g., primitive functions, discussed below) that, when performed on the managed computer, produce the requested management action. As discussed above, the agent software checks with the remote computer management server on an ongoing basis to see whether the remote computer management server has any management action(s) for the agent software to perform. If the remote computer management server has management action(s) for the agent software to perform, then the remote computer management server communicates one or more commands to the agent software that effect performance of the management action(s). In particular, the remote computer management server communicates command(s) to perform the operation(s) that comprise the management action(s) to be performed on the managed computer. The invention can be implemented so that a command communicated to agent software can instruct the agent software to perform a primitive function. A primitive function is a simple operation constituting a low-level interaction with a computer that accomplishes a single task. As indicated above, a management action can be effected by performance of one or more primitive functions. Table 1 gives examples of primitive functions that can be performed by agent software in accordance with invention (in general, the name of each primitive function makes the operation of the primitive function self-explanatory):

TABLE 1

| Primitive function | Operation |
| --- | --- |
| Get Registry Value | Read a value from the registry |
| Set Registry Value | Write a value to the registry |
| Delete Registry Value | Delete a value from the registry |
| Get File | Transmit a file to the remote computer management server |
| Write File | Obtain a file from the remote computer management server |

TABLE 1-continued

| Primitive function | Operation |
| --- | --- |
| Delete File | Delete a file |
| Execute File | Cause a file to begin executing on the managed computer |
| Get File properties | Read properties of a file |
| Check-in again immediately | Immediately check with the remote computer management server for instruction(s) |
| Flash icon in system tray to display dialog message | Produce appropriate display |
| Rename Locked File | Change the name of a locked file |
| Display Yes/no dialog box message | Produce appropriate display |
| Reboot | Restart the computer |
| Audit software and/or hardware configuration | Ascertain entire software and hardware configuration of the computer |
| Display dialog box message immediately (w/o flashing icon) | Immediately produce appropriate display |
| Execute Shell Command | Perform an operation specified by a shell command |
| Determine if application is running | Ascertain if a program is executing |
| Get Event Log entries | Read entries from Event Log |
| Close application | Cause an application program to stop operating |
| Get value for script variable (file content, directory path, etc. retrieved from agent software) | Read value of a script variable |
| Added printers to audit | Include printers in an audit of the software and hardware configuration of the computer |
| Execute DLL function | Make use of a function included in a DLL |
| Get File in multiple blocks | Transmit a file to the remote computer management server in multiple blocks |
| Enumerate registry subkeys | List the subkeys of the registry |
| Enumerate registry values | List the values of the registry |
| Enumerate directory listing | List the contents of a directory |
| Incremental audit (since last audit) | Ascertain changes in entire software and hardware configuration of the computer since last audit |
| Execute application and return output (non-windows application, command line output) | Perform operations specified by a program and obtain result of operations |
| Extend audit to include any file types, not just .exe | Include all file types in an audit of the software and hardware configuration of the computer |

The invention can be implemented so that after each operation is performed on the managed computer, the agent software communicates with the remote computer management server to report the performance of the operation and the result, if any, of performing the operation, then waits for a next command, if any, from the remote computer management server. The server software is implemented to synthesize the result(s) of the operation(s) performed on the managed computer (as communicated to the remote computer management server by the agent software) to produce a result of a management action represented by the operation(s) performed. Implementing the invention, as described above, so that the agent software effects requested management of a managed computer by successively executing relatively simple operations (e.g., primitive functions) and reporting the results to the remote computer management server enables the agent software to be implemented in a manner that requires few computational resources (e.g., data storage capacity, processing resources) of the managed computer, so that operation of the agent software on the managed computer is unobtrusive.

As discussed above, updating software used to implement (in whole or in part) a system for remote computer management after the software is installed and operating may disrupt operation of the remote computer management system, other operation of computer(s) on which the remote computer management system is implemented, and/or activities of users of the computer(s) on which the remote computer management system is implemented. The invention can advantageously be implemented so that the agent software can be updated in a manner that minimizes or eliminates disruption of operation of the invention on the managed computer, other operation of the managed computer, or user interaction with the managed computer. This can be achieved by transmitting from the remote computer management server to the managed computer (after installation of the agent software on the managed computer) a dynamically loaded library (DLL) including one or more sets of instructions and/or data that, when made use of by the agent software, produce functionality not enabled by the agent software at the time the DLL is transmitted to the managed computer; implementing the agent software to include the capability of performing one of the above-described primitive functions, AExecute DLL function,@ to make use when needed of functionality provided by a DLL; and transmitting from the remote computer management server to the managed computer instruction(s) to make use of particular functionality included in the newly provided DLL. The agent software can be implemented to provide an interface (function call definition) that can pass arbitrary commands and data to a DLL for execution. For example, the function call definition can include the number of parameters to be passed (one of which identifies the DLL to be executed), as well as a list of values of the parameters. More generally, the invention can be implemented so that new functionality is provided by any set of instructions and/or data that will not be identified as a new executing process on the managed computer. This approach to updating the agent software can be used, for example, when it is desired to add new remote computer management capabilities, such as, for instance, patch management or the ability to scan a LAN for devices connected to a managed computer, to those already enabled by the agent software.

The use of a DLL to update the functionality of the agent software as described above is advantageous for several reasons. First, the use of a DLL avoids the need to uninstall a version of the agent software already installed on the managed computer and install a new version of the agent software including the updated functionality, or install an update including the updated functionality to an existing version of the agent software. The agent software already installed on the managed computer can be used (with the DLL) to effect the updated functionality without modification, thus avoiding a disruptive installation or update process. Second, the use of a DLL avoids the need to engage (and modify) the security policy of the managed computer. Unlike, for example, the first attempt to begin operation of a new stand-alone executable file, making a first (or any) use of functionality included in a DLL is not considered a new process by security software, but, rather, part of a process that has already been authorized (i.e., in this case, operation of the agent software), and therefore avoids the disruption that would result if security software identified a new process, as discussed above. Further, since the agent software can be installed as a system service, any type of functionality (i.e., that requires any level of rights on the managed computer, such as operations that interact with the filesystem or the registry) can be added through inclusion in a DLL without triggering a security warning on the managed computer. Third, the use of a DLL enables great flexibility in updating of agent software. Since the disruption associated with other ways of updating agent software is not present, there is no motivation to avoid making small changes to the agent software, i.e., updates to agent software can be made with as fine a granularity as desired. Fourth, the use of a DLL can enable the amount of storage capacity required for the instructions and/or data comprising the agent software to be kept relatively small, since the invention can be implemented so that each managed computer receives only DLLs that are to be used on that managed computer.

Agent software can also be updated by installing a new version of agent software or providing an update to an existing version of agent software that includes the capability of performing one or more new primitive functions that could not be performed by the previous version of agent software installed on the managed computer. This approach can be used, for example, when a change to the operating system of the managed computer enables more or different primitive functions to be performed by the managed computer. This approach can also be used, for example, if a different operating system is used on a managed computer, e.g., the implementation of primitive functions for use on a managed computer operating in accordance with a Windows operating system can be different from that for primitive functions for use on a managed computer operating in accordance with a Unix operating system. In some embodiments of the invention, agent software can be updated by providing one or more new stand-alone executable files that implement primitive function(s).

Figure 2:
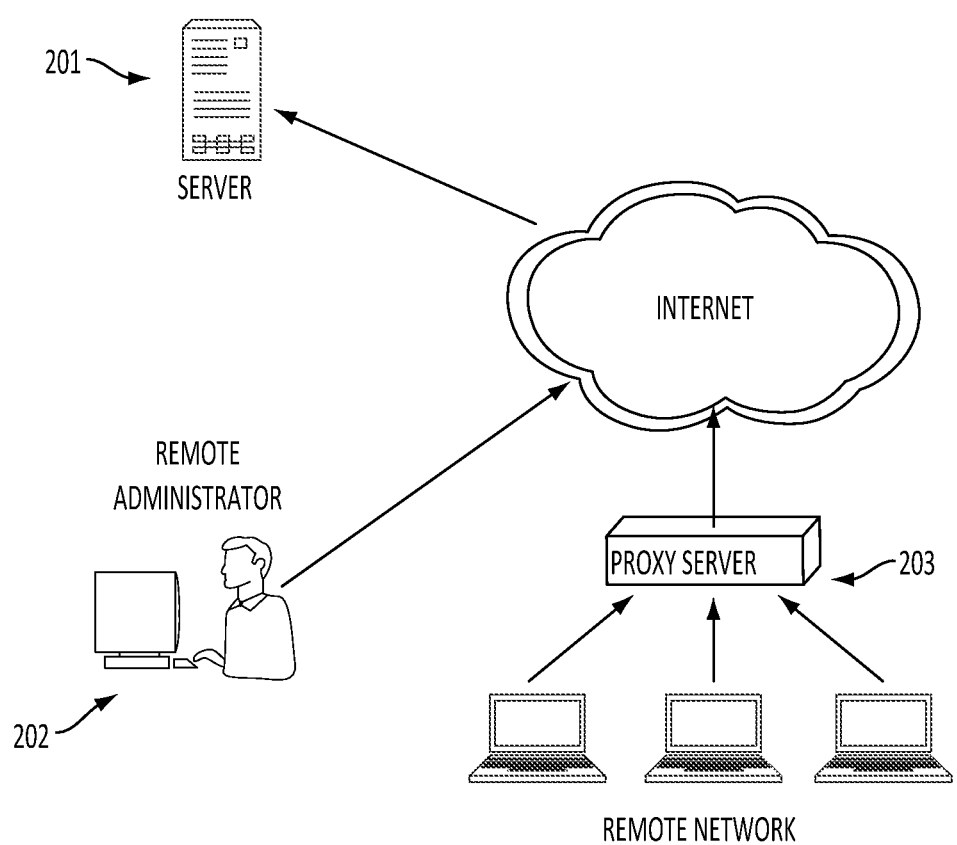
FIG. 2 is a diagram of another embodiment of a network in which remote computer management according to the invention can be used, illustrating another capability of the invention.

FIG. 2 is a diagram of another embodiment of a network in which remote computer management according to the invention can be used, illustrating another capability of the invention. In FIG. 2, as in FIG. 1, computers at various sites are connected to the Internet. A remote computer management server operates at site 201. A remote administrator uses a computer at site 202 to effect management of a remote computer by communicating request(s) for management action(s) to the remote computer management server. Computers at site 203 are connected to the Internet through a proxy server which mediates access to the Internet by those computers. As explained in more detail below, the invention can be implemented to enable the remote administrator to effect remote management of one or more of the computers at site 203, notwithstanding the presence of the proxy server.

When a proxy server is present at a computer network site, agent software operating on a managed computer at that site cannot directly communicate with a remote computer management server (i.e., attempt to communicate via the communication port assigned for communication with the remote computer management server), since all communication from the managed computer must be routed to the communication port assigned for communication with the proxy server. The invention can be implemented so that agent software can detect the presence of a proxy server and modify communication to the remote computer management server accordingly (i.e., route such communication to the communication port assigned for communication with the proxy server, with instructions to then send the communication to the remote computer management server). The presence of a proxy server can be detected by agent software using conventional methods for detecting the presence of a proxy server as known to those skilled in the art.

Figure 3:
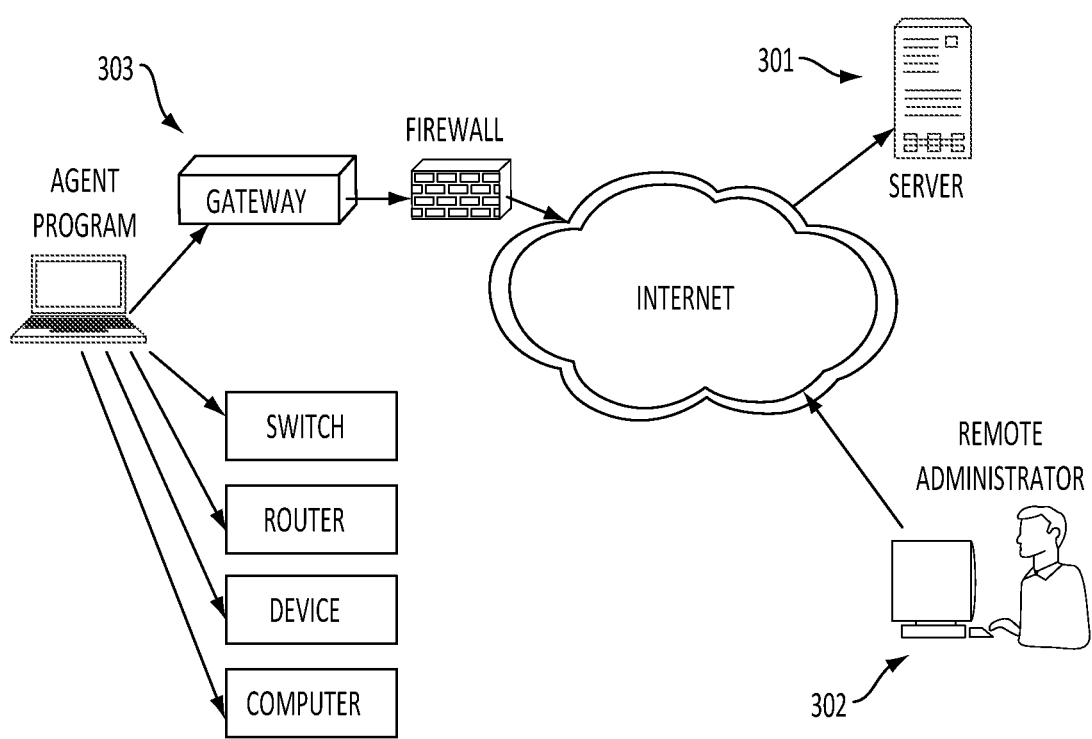
FIG. 3 is a diagram of another embodiment of a network in which remote computer management according to the invention can be used, illustrating another capability of the invention.

FIG. 3 is a diagram of another embodiment of a network in which remote computer management according to the invention can be used, illustrating another capability of the invention. In FIG. 3, as in FIG. 1, computers at various sites are connected to the Internet. A remote computer management server operates at site 301. A remote administrator uses a computer at site 302 to effect management of a remote computer by communicating request(s) for management action(s) to the remote computer management server. A computer at site 303 is connected to the Internet through a firewall and a gateway which mediate access to the Internet by the computer. The computer at site 303 is also connected to a switch, a router, a peripheral device and another computer. As explained in more detail below, the invention can be implemented to enable the remote administrator to enlist the computer at site 303 to effect remote management of devices connected to the computer: in particular, the agent software is used as a proxy to effect requested management action(s) regarding the connected devices.

In general, the invention can be implemented to enable use of a managed computer to effect management of any device with which the managed computer can directly communicate (i.e., without mediation by another entity, such as a firewall, gateway and/or proxy server). Such device need not (and typically will not) have agent software associated therewith or be susceptible to direct communication from the remote computer management server. For example, the invention can advantageously be implemented to enable use of a managed computer to effect management of any device that is part of a local area network (LAN) of which the managed computer is also part. The invention can also advantageously be implemented to enable use of a managed computer to effect management of any device with which the managed computer can communicate, but with which the remote computer management server cannot communicate directly. For example, the invention can be implemented to make use of the agent software as a proxy for effecting management of the devices illustrated in FIG. 3 that are connected to the managed computer at site 303, i.e., switch, router, peripheral device (such as, for example, a printer, scanner, keyboard or display monitor) and another computer. It can readily be appreciated that there are many other particular types of devices that can be managed in accordance with this aspect of the invention.

According to one embodiment of this aspect of the invention (i.e., use of agent software as a proxy to effect requested management of device(s) connected to a managed computer), the remote computer management server communicates a command to the agent software instructing the agent software to identify one or more devices connected to the managed computer, e.g., the agent software is instructed to scan a LAN of which the managed computer is part to identify each other device that is connected to the LAN. This can be done, for example, by the agent software issuing a TCP/IP ARP command (commonly known as a Aping@) to each IP address of a LAN of which the managed computer is part, responses to the Apings@ identifying the IP address, MAC address, and computer name (if available) of connected devices at those IP addresses. The agent software communicates with the remote computer management server to indicate whether there are any such connected devices and, if so, identify the device(s). If it is desired to effect management of one of the connected devices, the remote computer management server communicates one or more commands to the agent software that produce the requested management action(s). In addition to specifying operation(s) (e.g., primitive function(s), execution of function(s) included in a DLL) to be performed to produce the requested management action(s), the command(s) may also identify a communication protocol that is to be used by the agent software in communicating with the connected device that is to be managed (the ability to communicate with a connected device in accordance with a particular protocol can be accomplished, for example, by providing a DLL to the agent software that includes function(s) that enable such capability). For example, communication between devices connected via a LAN can occur in accordance with one of a variety of communication protocols, e.g., SNMP, DMI/WMI, ARP; each of these communication protocols can be used by agent software in communicating with a device connected to a managed computer to effect management action(s) regarding the connected device. The protocol to be used in communicating with a connected device can be ascertained by the remote computer management server from identification of the connected device (e.g., computer name). The protocol to be used in communicating with a connected device can also be ascertained by successively attempting communication formatted in accordance with a series of possible protocols until communication in accordance with one of the protocols is successful. The invention contemplates use of any communication protocol required or allowed by a connected device, including protocols not yet developed (e.g., new communication protocols that may be necessary to enable communication with devices that will be developed in the future).

Implementing the invention to enable use of a managed computer to effect management of any device connected to the managed computer can be advantageous for several reasons. The use of agent software as a proxy can eliminate the need for the remote computer management server to negotiate access to such other devices through one or more firewalls, gateways and/or proxy servers at that network site (since that has already been done in establishing communication between the agent software and the remote computer management server), which makes it easier to effect management of those devices. Additionally, the use of agent software as a proxy may enable management of devices with which the remote computer management server cannot otherwise communicate (e.g., a peripheral device connected to the managed computer, such as a printer, scanner, keyboard or display monitor).

The invention can be implemented so that communications between the agent software and the remote computer management server are secure. The invention can be implemented so that the agent software must authenticate itself to the remote computer management server to enable communication between the agent software and the remote computer management server to occur. Additionally or alternatively, the invention can be implemented so that communication between the agent software and the remote computer management server is encrypted. The invention can be implemented so that all security features (e.g., authentication algorithm(s) and parameters, encryption algorithm(s) and parameters) are embodied in software (i.e., one or more computer programs and/or data structures, and/or part of one or more computer programs and/or data structures). For example, the invention can be implemented so that all security features are part of the agent software and cannot be accessed by a process other than the agent software. This can be desirable to protect communication between the agent software and the remote computer management server from external attacks, e.g., to prevent another process from hijacking the communication to produce unauthorized communications. The invention can be implemented so that the length of an encryption key is established at the time of linking and compiling the agent software and server software. This can be desirable, for example, to prevent an external alteration to, or attack on, the strength of the encryption algorithm.

Figure 4:
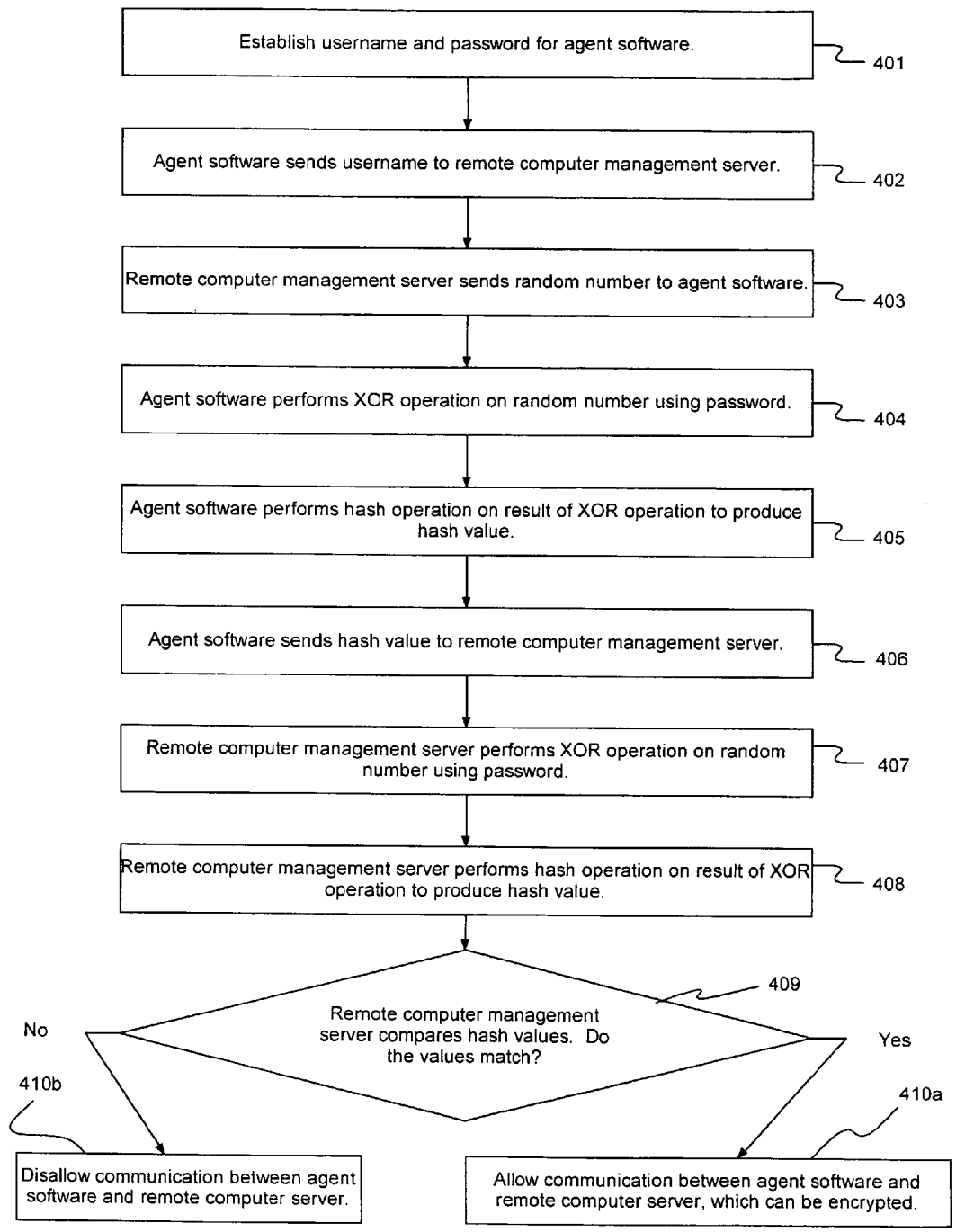
FIG. 4 is a flow chart of a method in accordance with the invention for providing secure and authenticated communication between agent software operating on a managed computer and a remote computer management server.

FIG. 4 is a flow chart of a method in accordance with the invention for providing secure and authenticated communication between agent software operating on a managed computer and a remote computer management server. In step 401, a username and password is established for the agent software on the managed computer. For example, the username and password can be established as part of the installation of the agent software on the managed computer. Any desired constraints can be placed on the username and password, e.g. minimum and/or maximum number of characters, required number of letters and/or numbers, prohibited characters. In a particular implementation of the invention, each of the username and password are restricted to a maximum and minimum length (which helps ensure strong passwords). In step 402, the agent software initiates communication with the remote computer management server by sending the agent software=s username to the remote computer management server. The username can be sent in plaintext or encoded. In step 403, in response, the remote computer management server sends a random number (e.g., a 256 bit random number) to the agent software. The random number can be sent in plaintext or encoded. In step 404, the agent software performs an XOR operation (e.g., a bit-wise XOR operation) on the random number using the agent software=s password. In step 405, the agent software performs a hash operation on the result obtained in step 404. Any appropriate algorithm can be used to perform the hash operation; in one implementation of the invention, the Secure Hash Algorithm-1 (SHA-1) algorithm is used. In step 406, the hash value produced in step 405 is sent to the remote computer management server in plaintext. In step 407, the remote computer management server performs an XOR operation (e.g., a bit-wise XOR operation) on the random number using the password for the agent software that is known by the remote computer management server (e.g., stored at the remote computer management server). In step 408, the remote computer management server performs a hash operation on the result obtained in step 407. The same algorithm used in step 405 must be used to perform the hash operation in step 408; thus, in an implementation of the invention as discussed above with respect to step 405, the SHA-1 algorithm is used to perform the hash operation of step 408. In step 409, the remote computer management server compares the hash value produced by the agent software (step 405) to the hash value produced by the remote computer management server (step 408). If the values match, then the agent software has been authenticated and communication between the agent software and the remote computer management server is allowed to proceed in step 410*a*. If not, communication between the agent software and the remote computer management server is not allowed, as shown in step 410*b*. Failed attempts at authentication can be logged by the remote computer management server. If the agent software is authenticated in step 409, then, in step 410*a*, each subsequent communication between the agent software and the remote computer management server can be encrypted. Any encryption algorithm can be used. In one implementation of the invention, an n-bit RC4 algorithm is used (e.g., 128 bit, 256 bit). The encryption key can be determined in any appropriate manner. For example, the first n bits of the hash value (determined in steps 405 and 408) can be used as the encryption key.

To enhance the security of communication between the agent software and the remote computer management server, the invention can be implemented so that a Arolling key@ is used in encrypting communications between the agent software and remote computer management server, i.e., a new encryption key is generated for each communication session (each time that the agent software initiates communication with the remote computer management server). Each new encryption key can be generated in any appropriate manner. For example, when the method described above with respect to FIG. 4 is used to authenticate the agent software and encrypt communications for each communication session between the agent software and the remote computer management server, a new encryption key can be produced for each communication session by updating (changing) the agent software=s password at both the managed computer and the remote computer management server after each communication session has been completed. (As discussed above, an encryption key can be extracted from the hash value, e.g, the first n bits of the hash value, produced by performing a hash operation on the result of an XOR operation performed on a random number using the password.) Any appropriate method can be used for updating the agent software=s password, so long as the same method is used by both the agent software and the remote computer management server.

A communication session can include many communications between the managed computer and remote computer management server. On occasion, a communication session is unintentionally interrupted, i.e., terminated before all communications for that session have been completed. (As is well known, this is a not uncommon occurrence during communication via a network, particularly when the network is large and/or complex, that can occur for any of a variety of reasons.) When the invention is implemented so that a Arolling key@ is used in encrypting communications between the agent software and remote computer management server, interruption of a communication session can cause the current agent software password stored at the managed computer to become different from the current agent software password stored at the remote computer management server. This may occur, for example, if one of the remote computer management server and agent software concludes that the communication terminated normally, while the other does not (e.g., if the network connection was lost at a particular point in time that leads to this conclusion). In that case, the agent software cannot authenticate itself to the remote computer management server. If the agent software cannot be authenticated to the remote computer management server, then the agent software must be re-installed on the managed computer to re-initialize the agent software password (the agent software can be implemented, for example, so that a unique initial password is associated with each copy of the agent software operating on a particular managed computer). To reduce or eliminate the need for this (and avoid the human intervention that would be required to again make remote computer management available), the invention can be implemented so that a specified number (e.g., 2, 3, 4) of the most recent agent software passwords are stored by both the managed computer and the remote computer management server. If authentication fails with the most recent passwords stored by the managed computer and remote computer management server, different combinations of the passwords stored by the managed computer and remote computer management server are successively tried until authentication occurs, or no more combinations remain to be tried. In most cases, one of the sets of passwords will match, so that the agent software can be authenticated without need for re-installation of the agent software.

Figure 5:
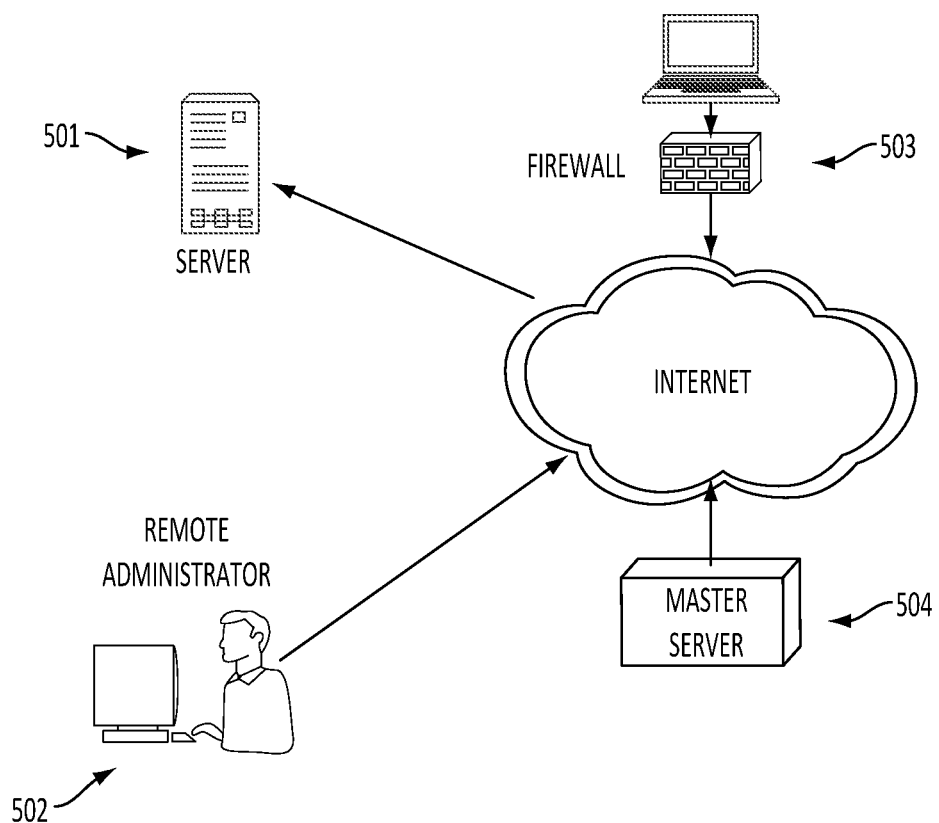
FIG. 5 is a diagram of another embodiment of a network in which remote computer management according to the invention can be used, illustrating another embodiment of remote computer management in accordance with the invention.

FIG. 5 is a diagram of another embodiment of a network in which remote computer management according to the invention can be used, illustrating another embodiment of remote computer management in accordance with the invention. In FIG. 5, as in FIGS. 1, 2 and 3, computers at various sites are connected to the Internet. A remote computer management server operates at site 501. A remote administrator uses a computer at site 502 to effect management of a remote computer by communicating request(s) for management action(s) to the remote computer management server. A computer at site 503 is connected to the Internet through a firewall which controls access to the Internet by the computer. A Amaster server@ operates at site 504. The master server supplies the remote computer management server at site 501 with the server software and provides updates to the server software as they occur (the master server can also provide the same service for other remote computer management servers located at other sites, not shown in FIG. 5).

The invention can be implemented, in whole or in part, by one or more computer programs and/or data structures, or as part of one or more computer programs and/or data structures, including instruction(s) and/or data for accomplishing the functions of the invention. The one or more computer programs and/or data structures can be implemented using software and/or firmware that is stored and operates on appropriate hardware (e.g., processor, volatile data storage apparatus such as a memory, non-volatile data storage apparatus such as a hard disk). Additionally, as well understood by those skilled in the art in view of the description herein, the one or more computer programs and/or data structures can effect use of appropriate hardware to effect the functions of the invention (e.g., processor; volatile and/or non-volatile data storage apparatus, such as a memory and/or hard disk; network communication apparatus). Those skilled in the art can readily implement the invention using one or more computer programs and/or data structures in view of the description herein. Further, those skilled in the art can readily appreciate how to implement such computer program(s) and/or data structure(s) to enable execution on any of a variety of computational apparatus and/or using any of a variety of computational platforms.

Various embodiments of the invention have been described. The descriptions are intended to be illustrative, not limiting. Thus, it will be apparent to one skilled in the art that certain modifications may be made to the invention as described herein without departing from the scope of the claims set out below.

We claim:

1. A non-transitory computer readable storage memory encoded with one or more computer programs being executed to cause a processor to perform:
   performing one or more primitive functions via agent software installed on a managed computer;
   transmitting, from a remote computer management server to the managed computer, a dynamically loaded library (DLL) including one or more sets of instructions that, when implemented by the agent software, produce functionality not enabled by the agent software at the time the DLL is transmitted to the managed computer, the functionality performed by the DLL comprising:
   transmitting device identification information to the remote computer management server indicating existence of at least one device connected to the managed computer;
   receiving at the managed computer another DLL comprising additional commands instructing the agent software to perform management actions responsive to the identification information transmitted, the additional commands identifying a communication protocol to be used by the agent software when communicating with the at least one device; and
   transmitting from the managed computer to the remote computer management server a result of the performance of the management action.

2. The non-transitory computer readable storage memory as in claim 1, that causes the processor to perform receiving at the managed computer a request from the remote computer management server to perform a management action.

3. The non-transitory computer readable storage memory as in claim 1, that further causes the processor to perform routing all communication between the managed computer and the remote computer management server.

4. The non-transitory computer readable storage memory as is claim 1, that further causes the processor to perform the routing through a single network communications port that is allowed for other network communication by a firewall and/or gateway that mediates communication with the managed computer.

5. The non-transitory computer readable storage memory as in claim 1, that causes the processor to perform authenticating the managed computer to the remote computer management server.

6. The non-transitory computer readable storage memory as in claim 1, that causes the processor to perform encrypting communication between the managed computer and the remote computer management server.

7. The non-transitory computer readable storage memory as in claim 6, wherein the encrypting communication between the managed computer and the remote computer management server causes the processor to perform at least one of:
   generating a new encryption key each time that the managed computer initiates communication with the remote computer management server; and
   successively comparing different combinations of a specified number of the most recent encryption keys stored by the managed computer and a specified number of the most recent encryption keys stored by the remote computer management server.

8. The non-transitory computer readable storage memory as in claim 1, wherein the primitive functions are at least one of:
   get value for script variable;
   added printers to audit;
   get File in multiple blocks;
   enumerate registry subkeys;
   enumerate registry values;
   enumerate directory listing;
   incremental audit;
   execute application and return output; and
   extend audit to include file types in addition to .exe.

9. The non-transitory computer readable storage memory as in claim 1, that causes the processor to perform scanning a LAN associated with the managed computer to perform the identifying of the at least one device.

10. The non-transitory computer readable storage memory as in claim 1, that causes the processor to perform receiving responses at the managed computer indicating the presence of the at least one device.

11. The non-transitory computer readable storage memory as in claim 1, that causes the processor to perform transmitting periodic messages from the managed computer to the remote computer management server, wherein the transmitting periodic messages from the managed computer to the remote computer management server determines whether there is an outstanding management action that needs to be performed by the managed computer.

12. A method, comprising:
   performing one or more primitive functions via agent software installed on a managed computer;
   transmitting, from a remote computer management server to the managed computer, a dynamically loaded library (DLL) including one or more sets of instructions that, when implemented by the agent software, produce functionality not enabled by the agent software at the time the DLL is transmitted to the managed computer, the functionality performed by the DLL comprising:
   transmitting device identification information to the remote computer management server indicating existence of at least one device connected to the managed computer;
   receiving at the managed computer another DLL comprising additional commands instructing the agent software to perform management actions responsive to the identification information transmitted, the additional commands identifying a communication protocol to be used by the agent software when communicating with the at least one device; and
   transmitting from the managed computer to the remote computer management server a result of the performance of the management action.

13. The method of claim 12, comprising receiving at the managed computer a request from the remote computer management server to perform a management action.

14. The method of claim 12, comprising routing all communication between the managed computer and the remote computer management server through a single network communications port that is allowed for other network communication by a firewall and/or gateway that mediates communication with the managed computer.

15. The method of claim 12, comprising authenticating the managed computer to the remote computer management server.

16. The method of claim 12, comprising encrypting communication between the managed computer and the remote computer management server, wherein the encrypting comprises at least one of:
 generating a new encryption key each time that the managed computer initiates communication with the remote computer management server; and
 successively comparing different combinations of a specified number of the most recent encryption keys stored by the managed computer and a specified number of the most recent encryption keys stored by the remote computer management server.

17. The method of claim 12, comprising scanning a LAN associated with the managed computer to perform the identifying of the at least one device.

18. The method of claim 12, comprising receiving responses at the managed computer indicating the presence of the at least one device.

19. The method of claim 12, comprising transmitting periodic messages from the managed computer to the remote computer management server, wherein the transmitting periodic messages from the managed computer to the remote computer management server determines whether there is an outstanding management action that needs to be performed by the managed computer.

20. The method of claim 12, wherein the primitive functions are at least one of:
 get value for script variable;
 added printers to audit;
 get File in multiple blocks;
 enumerate registry subkeys;
 enumerate registry values;
 enumerate directory listing;
 incremental audit;
 execute application and return output; and
 extend audit to include file types in addition to .exe.

* * * * *